April 3, 1934.   J. MARSEL   1,953,622
ELECTRIC INSECT DESTROYER
Filed July 22, 1932
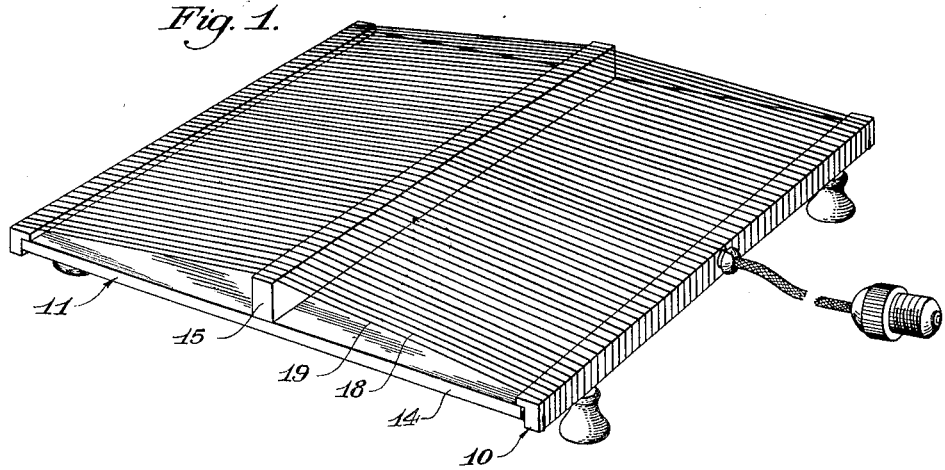
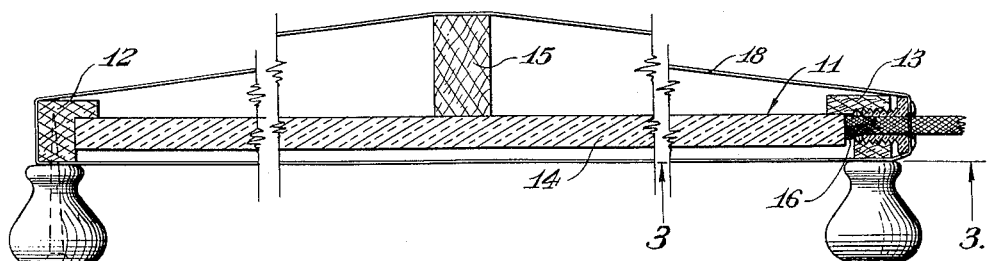
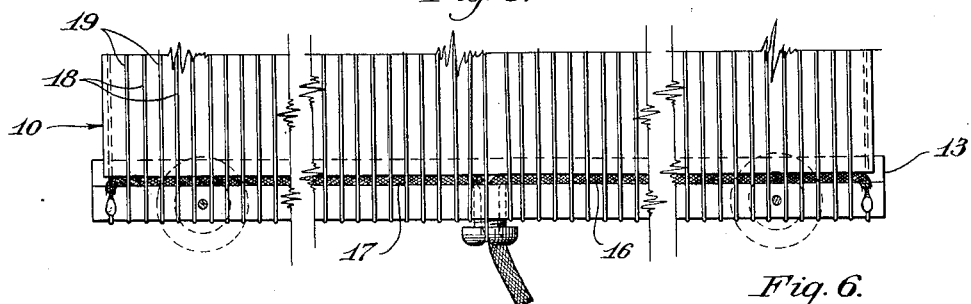
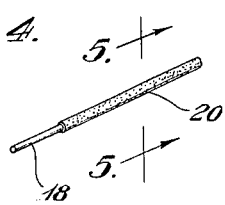
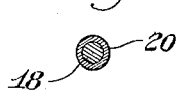
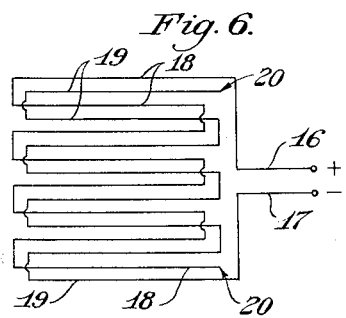
Joseph Marsel
INVENTOR
BY Victor J. Evans & Co.
WITNESS: HIS ATTORNEYS Patented Apr. 3, 1934

1,953,622

UNITED STATES PATENT OFFICE 1,953,622

ELECTRIC INSECT DESTROYER

Joseph Marsel, Marseilles, Ill., assignor of one-half to Cyrus P. Trowbridge, Marseilles, Ill.

Application July 22, 1932, Serial No. 624,104

4 Claims. (Cl. 43—112)

This invention relates to certain novel improvements in electric insect destroyers, and has for its principal object the provision of an improved construction of this character which will be highly efficient in use and economical in manufacture.

Another object of this invention, is to provide an insect-destroying device which will effectively lure insects thereto and which may be relied upon to destroy insects alighting thereon.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view of a preferred form of the new device;

Fig. 2 is a vertical sectional view of the same;

Fig. 3 is a sectional view on line 3—3 of Fig. 2;

Fig. 4 is a fragmentary perspective view of one of the new lure-coated conductors embodied in the invention;

Fig. 5 is a sectional view on line 5—5 of Fig. 4; and

Fig. 6 is a schematic view of the wiring diagram employed in the device.

The new insect-destroying device is generally indicated at 10 and comprises a conventional non-conductive frame 11. This frame includes a plate 14 having end pieces 12 and 13; and a bridge 15 extending across the plate 14. Conventionally attached to the frame 10 is a pair of oppositely charged lead-in conductors 16 and 17, continuous with which is a lure-grid that includes oppositely charged uninsulated wires or conductors 18 and 19, respectively. These conductors 18 and 19 form a normally open circuit and are wound alternately about the frame 10 in pairs of parallel oppositely charged conductors having "dead" ends 20 suitably embedded in the frame 10; so that the circuit (Fig. 6) is normally open and not consuming electric current.

To lure the insects to the conductors 18—19, I provide on the uninsulated conductors 18—19 a coating 20 of an insect-luring substance. This sugar-containing substance I have found to be preferably honey because honey is both an insect lure and a good conductor of electricity; thereby assuring that the insect, alighting upon a pair of oppositely charged conductors 18 and 19, will complete circuit therebetween and be destroyed. Honey contains a certain amount of water, to which its conductive properties are probably due, and being very viscous, a coating of honey once applied to the conductors 18—19, by means of a brush, swab, or the like, it will retain its water content, adhere to the conductors, and function for a considerable period of time without replacement. Furthermore, the honey coating when dry may be readily and inexpensively renewed by simply dipping a brush or swab in honey and running the same over the conductors 18—19.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. An electrical insect destroyer comprising the combination of a non-conductive frame, a lure-grid associated with said frame including an open circuit of uninsulated parallel conductors arranged alternately upon the frame in pairs of conductors of opposite polarity, and a surface coating of an insect-luring electrically conductive substance applied to said conductors and forming a part of said lure-grid.

2. An electrical insect destroyer comprising the combination of a non-conductive frame, a lure-grid associated with said frame including an open circuit of uninsulated parallel conductors arranged alternately upon the frame in pairs of conductors of opposite polarity, and said conductors having thereon a surface coating of electrically conductive, insect-luring honey forming a part of said lure-grid.

3. An electrical insect destroyer, comprising the combination of an electrically non-conductive frame; a lure-grid associated with said frame including a normally open circuit of uninsulated parallel conductors having a surface coating of an insect-luring electrically conductive substance applied thereto and forming a part of said lure-grid.

4. An electrical insect destroyer, comprising the combination of an electrically non-conductive frame; a lure-grid associated with said frame including a normally open circuit of uninsulated parallel conductors having a surface coating of an insect-luring electrically conductive and sugar-containing substance applied thereto and forming a part of said lure-grid.

JOSEPH MARSEL.